(No Model.) 2 Sheets—Sheet 1.

W. D. PENNYPACKER.
Street Sweeper.

No. 242,971. Patented June 14, 1881.

Witnesses:
Hubert Howson
Harry Smith

Inventor:
William D. Pennypacker
by his Attorneys
Howson and Son

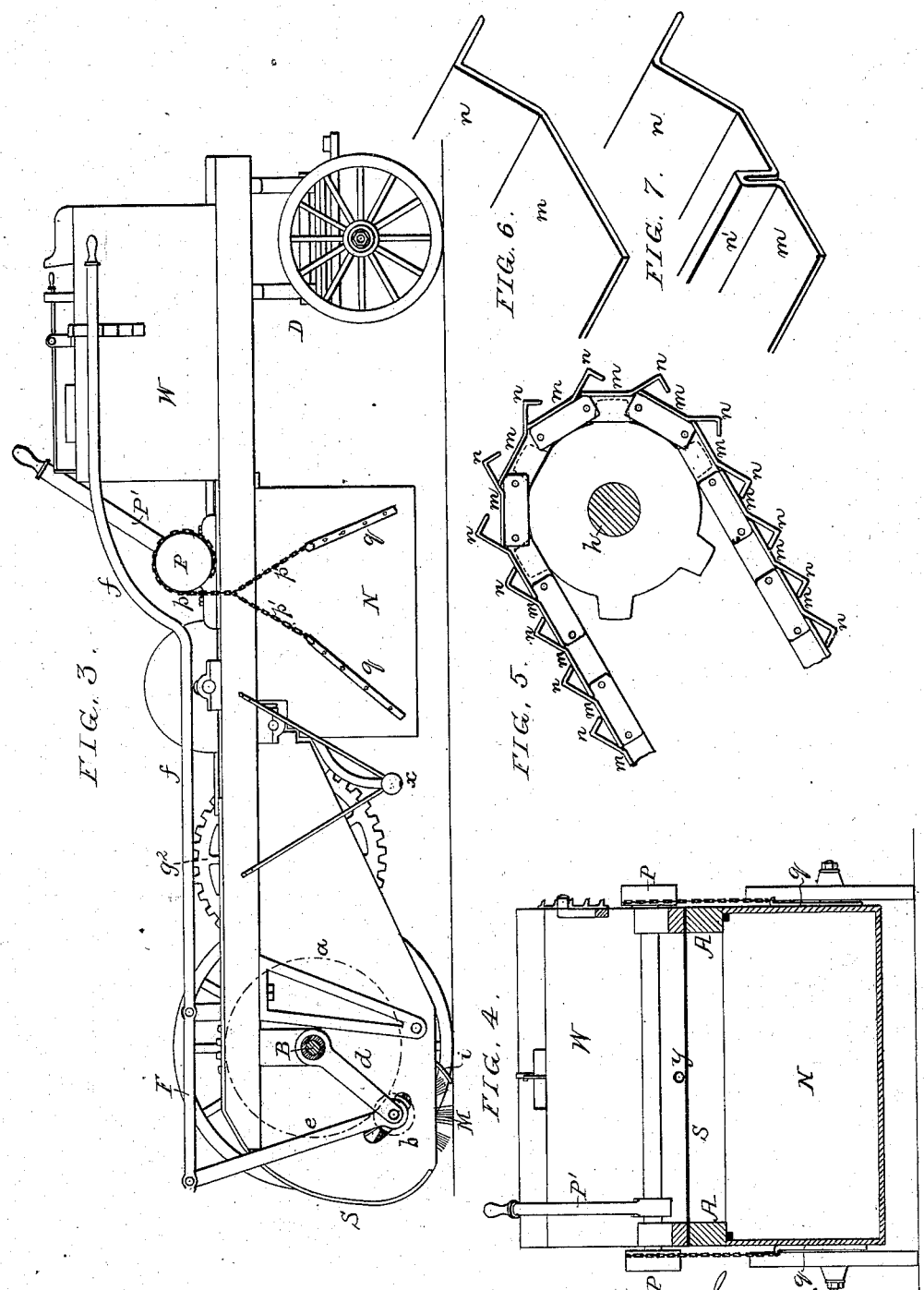

UNITED STATES PATENT OFFICE.

WILLIAM D. PENNYPACKER, OF PHILADELPHIA, PENNSYLVANIA.

STREET-SWEEPER.

SPECIFICATION forming part of Letters Patent No. 242,971, dated June 14, 1881.

Application filed November 15, 1880. (No model.)

*To all whom it may concern:*

Be it known that I, WILLIAM D. PENNYPACKER, a citizen of the United States, residing in Philadelphia, Pennsylvania, have invented certain Improvements in Street-Sweeping Machines, of which the following is a specification.

My invention relates to a street-sweeping machine of simple construction, whereby the dirt is swept up and deposited in a receptacle detachable from the main frame, the principal objects of my invention being to provide for the ready removal of the filled receptacle and the application of an empty one in place thereof, to insure uniformity in the action of the sweeping-brush, to provide an efficient conveyer for the dirt, and to prevent the dissemination of dust by the machine when at work.

Figure 1:
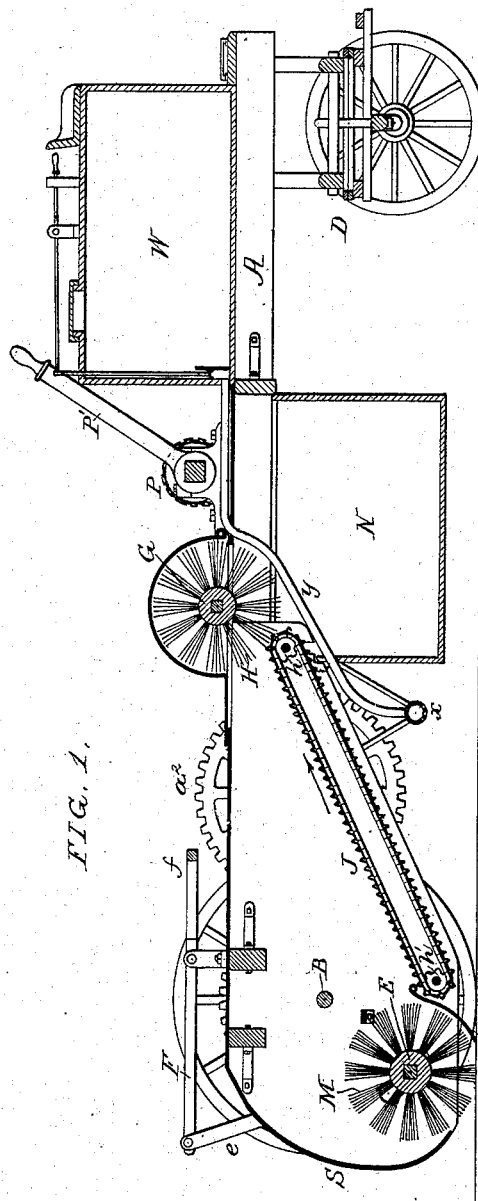
Figure 2:
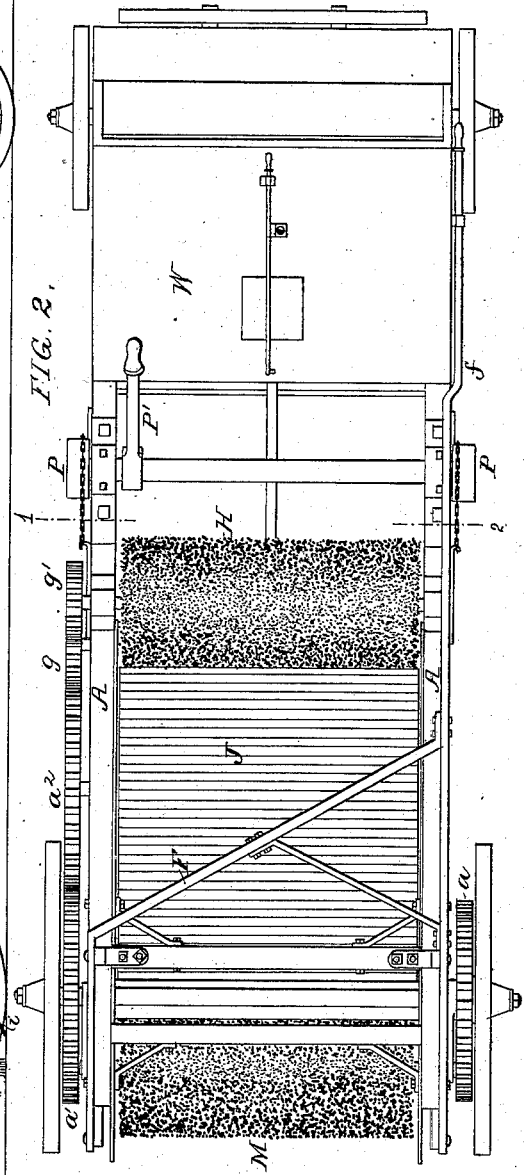

In the accompanying drawings, Figure 1, Sheet 1, is a longitudinal section of my improved street-sweeping machine; Fig. 2, a plan view of the same with the casing removed; Fig. 3, Sheet 2, a side view of the machine; Fig. 4, a transverse section on the line 1 2; and Figs. 5, 6, and 7 detached views of parts of the machine.

A A represent the opposite side frames of the machine, which are suitably connected together, are furnished with bearings for the rear axle, B, and are supported at the front ends by the truck D, both the rear axle and the forward truck being provided with suitable wheels. The axle B is adapted to bearings on the frame A, so as to turn freely therein, and to said axle, near one end of the same, is secured a cog-wheel, $a$, a similar cog-wheel, $a'$, being secured to the axle, near the opposite end of the same, and both wheels, $a\ a'$, being keyed to the axle, to which is also keyed one of the hind wheels, the other wheel being loose; or, in place of this method of construction, the axle B may be fixed and both wheels may be loose thereon, said wheels in this case carrying the cog-wheels $a\ a'$. The hind wheels should in any case be capable of rotating independently of each other, in order to facilitate the turning of the apparatus in a contracted space.

The cog-wheel $a$ gears into a pinion, $b$, on one end of the main brush-shaft E, the latter turning in bearings in arms $d$, hung to the rear axle, B, which arms are connected by rods $e$ to a frame, F, pivoted to suitable bearings on the main frame, and provided with an operating arm or handle, $f$, whereby the brush may be raised or lowered, as desired.

The frame F is so braced as to be perfectly rigid, so that the elevation of one end of the brush-shaft independently of the opposite end is impossible, the brush being thereby kept properly in line at all times, and uniform sweeping action insured.

The rods $e$ might in some cases be connected to the opposite ends of the brush-shaft, instead of to the arms $d$, and the pinion $b$ may, if desired, be secured to the shaft E by means of an ordinary pawl-and-ratchet connection, so that it will not transmit movement to the shaft when turned backward.

The cog-wheel $a'$ on the axle B gears into an idler-wheel, $a^2$, hung to a stud on the side frame, and gearing into a pinion, $g$, on a shaft, $h$, which extends transversely across the machine and is adapted to bearings in the side frames, A A. The pinion $g$ gears into a pinion, $g'$, on a transverse shaft, G, carrying a brush, H. (See Figs. 1 and 2.)

J is an endless belt or conveyer, adapted at the upper end to chain-pulleys on the shaft $h$, and at the lower end to similar pulleys on a transverse shaft, $h'$, so that as the machine is drawn forward over the ground movement in the direction of the arrow, Fig. 1, is imparted to said conveyer. The conveyer consists of a series of chain-belts, two, three, or more, carrying transverse strips $m$, preferably of sheet metal, the front end of each strip being bent so as to form a hollow projecting rib, $n$, these ribs performing the same duty as the transverse strips or buckets of an ordinary conveyer, and the ribbed portion of one plate projecting over the rear end of the plate in advance, so that as the conveyer passes around the shaft $h$ there will be no spaces between the plates for the passage of dust. (See Fig. 5.)

The dirt is swept up by the lower brush, M, on the shaft E, over an apron, $i$, and onto the conveyer J, by which it is carried up, and from which it is discharged by means of the brush H into a receptacle, N, hung by chains $p$ from a drum, P, adapted to suitable bearings on the frames A A, said drum being provided with an operating-arm, P', whereby it may be turned, or partially turned, so as to raise or lower the said receptacle N, suitable devices being employed for retaining the arm in position when the receptacle is elevated. Each of the lifting-chains $p$ has two branches, $p'$, these branches being adapted to the hooked upper ends of bars $q$ secured to the opposite sides of the receptacle N, so that when a filled receptacle has been lowered to the ground the chains can be readily detached from the hooked bars $q$, and as readily attached to the bars of an empty receptacle, which replaces the filled one.

The brushes M and H and the conveyer J are provided with a protecting-casing, S, to prevent the escape of dust while the machine is in operation, and in order to lessen the amount of dust raised by the sweeping operation I provide the apparatus with a sprinkling-tube, $x$, arranged beneath the conveyer J, and communicating through a pipe, $y$, with the reservoir W, which is mounted upon the frame A above the front truck, and is provided with the usual valve and valve-operating device, whereby the flow of water from the sprinkler may be readily governed by the driver of the machine.

In some cases each of the conveyer-strips $m$ may have a rib, $n'$, in addition to the rib $n$, for the purpose of assisting in the elevation of the dirt and preventing the escape of dirt between the strips.

It will be observed that when the receptacle N has been lowered and released from the chains $p$ it can be readily removed laterally from beneath the frame, the wheels and sweeping mechanism being so arranged as not to interfere with such removal.

The frames A are extended beyond the receptacle to such an extent that the wheels of the front truck can be run under the frame in turning the machine, which operation can, owing to this feature, and to the independent movement of the rear wheels, be effected in a very contracted space. Owing to the fact that the power is transmitted directly from the rear axle, or one of the rear wheels to the brush-shaft, the construction of this portion of the machine is simplified and the effective operation of the brush insured.

I claim as my invention—

1. The combination of the sweeping-brush, the conveyer, and the receptacle of the machine with means for raising, lowering, and releasing said receptacle, and with a frame and supporting-wheels constructed and arranged in respect to the sweeping devices and receptacle, as set forth, whereby, when said receptacle is lowered and detached, the lateral removal of the same is permitted, as set forth.

2. The combination of the frame of the machine, the brush-shaft E, the rear axle, B, the arms $d$, carrying the brush-shaft and hung to said axle B, and the pivoted frame F, connected to said arms $d$, or to the opposite ends of the brush-shaft, and having a single operating-arm, $f$, as set forth.

3. The combination of the sweeping-brush and receptacle with an endless conveyer consisting of a series of chain-belts carrying independent transverse strips $m$, with ribs $n$, as specified.

4. The combination of the belts with the transverse strips $m$, having hollow projecting ribs $n$ overlapping the rear edges of the strips in advance, as described.

5. The combination of the belts with transverse strips $m$, having hollow projecting ribs $n$ and ribs $n'$, as specified.

6. The combination of the frame of the machine, the receptacle N, having hooked plates $q$, the chains $p$, having branches $p'$, and the hoisting-drum P, as described.

7. The combination of the frame of the machine, its receptacle, and sweeping devices, with the water-reservoir W, and the sprinkling-tube $x$, communicating therewith and arranged in the rear of the receptacle and beneath the conveyer, as set forth.

In testimony whereof I have signed my name to this specification in the presence of two subscribing witnesses.

WM. D. PENNYPACKER.

Witnesses:
JAMES F. TOBIN,
HARRY SMITH.